US008038883B2

(12) United States Patent
Bargeman et al.

(10) Patent No.: US 8,038,883 B2
(45) Date of Patent: *Oct. 18, 2011

(54) PROCESS TO PREPARE SALT

(75) Inventors: Gerrald Bargeman, Wageningen (NL);
René Lodewijk Maria Demmer, Enter (NL); Antoon Ten Kate, Arnhem (NL); Boris Kuzmanovic, Essen (DE); Cornelis Elizabeth Johannus Van Lare, Wijchen (NL); Mateo Jozef Jacques Mayer, Amersfoort (NL); Maarten André Irène Schutyser, Wageningen (NL); Jan Barend Westerink, Lochem (NL)

(73) Assignee: Akzo Nobel N.V., Arnhem (NL)

( * ) Notice: Subject to any disclaimer, the term of this patent is extended or adjusted under 35 U.S.C. 154(b) by 831 days.

This patent is subject to a terminal disclaimer.

(21) Appl. No.: 11/884,189

(22) PCT Filed: Feb. 13, 2006

(86) PCT No.: PCT/EP2006/050869
§ 371 (c)(1),
(2), (4) Date: Mar. 25, 2008

(87) PCT Pub. No.: WO2006/087302
PCT Pub. Date: Aug. 24, 2006

(65) Prior Publication Data
US 2008/0185340 A1 Aug. 7, 2008

Related U.S. Application Data

(60) Provisional application No. 60/654,083, filed on Feb. 18, 2005.

(30) Foreign Application Priority Data

Jul. 18, 2005 (EP) .................................... 05106574

(51) Int. Cl.
*B01D 11/00* (2006.01)
*C22B 26/10* (2006.01)

(52) U.S. Cl. ........ 210/639; 210/644; 210/651; 210/805; 423/499.4; 423/499.5

(58) Field of Classification Search .................. 204/525, 204/527, 538; 210/638, 639, 641, 650, 651, 210/749, 805, 806, 644; 205/464, 473, 498, 205/502, 503, 618; 423/462, 491, 499.1, 423/499.4, 499.5, 500, 641

See application file for complete search history.

(56) References Cited

U.S. PATENT DOCUMENTS

| 3,419,492 A * | 12/1968 | Bloch .......................... 210/673 |
| 3,578,589 A * | 5/1971 | Hwa et al. .................... 210/701 |
| 3,619,424 A * | 11/1971 | Blanchard et al. ............ 210/645 |
| 4,038,365 A | 7/1977 | Patil et al. |
| 4,156,645 A * | 5/1979 | Bray ............................. 210/652 |
| 4,176,022 A | 11/1979 | Darlington |
| 4,303,624 A | 12/1981 | Dotson et al. |
| 4,911,844 A | 3/1990 | Linder et al. |
| 5,158,683 A | 10/1992 | Lin |
| 5,254,257 A | 10/1993 | Brigano et al. |
| 5,256,303 A | 10/1993 | Zeiher et al. |
| 5,458,781 A | 10/1995 | Lin |
| 5,858,240 A | 1/1999 | Twardwoski et al. |
| 6,004,464 A | 12/1999 | Lien et al. |
| 6,036,867 A | 3/2000 | Jogand et al. |
| 6,331,236 B1 * | 12/2001 | Mani ............................. 204/525 |
| 7,083,730 B2 * | 8/2006 | Davis ........................... 210/652 |
| 7,459,088 B2 * | 12/2008 | Davis ........................... 210/702 |
| 2003/0000897 A1 | 1/2003 | Mayers |
| 2003/0049197 A1 | 3/2003 | Mayers |
| 2003/0205526 A1 * | 11/2003 | Vuong .......................... 210/652 |
| 2004/0055955 A1 * | 3/2004 | Davis ........................... 210/652 |
| 2006/0157410 A1 * | 7/2006 | Hassan ......................... 210/637 |

FOREIGN PATENT DOCUMENTS

| DE | 33 38 194 | 5/1985 |
| EP | 1 202 931 | 5/2002 |
| GB | 2 395 946 | 6/2004 |
| JP | 2101-887 | 10/1985 |
| WO | 96/33005 | 10/1996 |
| WO | 02/102713 | 12/2002 |
| WO | 03/006377 | 1/2003 |
| WO | 03/031033 | 4/2003 |
| WO | 2004/096404 | 11/2004 |
| WO | 01/04052 | 1/2007 |

OTHER PUBLICATIONS

Saline Lakes, The largest, highest & lowest lakes of the world!, Soil & Water Conservation Society of Metro Halifax (SWCSMH), Nova Scotia, Canada, Jan. 5, 2006, downloaded from the internet on Feb. 18, 2011.*

Elsevier Publishing Company, *Chlor-Alkali Industry*, pp. 92-96, (1971).

(Continued)

*Primary Examiner* — Joseph Drodge
(74) *Attorney, Agent, or Firm* — Kenyon & Kenyon LLP

(57) ABSTRACT

The present invention relates to a process to prepare salt comprising the following steps: (i) preparing an aqueous salt solution containing at least 100 g/l of sodium chloride and at least 0.01 ppm of polyvalent cations by dissolving a sodium chloride source in industrial water, (ii) adding an effective amount of at least one positive retention enhancing component to the aqueous salt solution, (iii) subsequently subjecting the solution to a nanofiltration step, thereby separating the solution into a retentate which is enriched for the polyvalent cations and a permeate which is the purified aqueous salt solution, and (iv) concentrating the permeate to produce salt.

20 Claims, No Drawings

OTHER PUBLICATIONS

Pletcher, D., et al., "Sodium Chlorate and Sodium Bromate," *Industrial Electrochemistry*, $2^{nd}$ Ed., pp. 269-273, (1990).

International Search Report, International Application No. PCT/EP2006/050869, mailed Apr. 5, 2006.

International Preliminary Report on Patentability and Written Opinion, International Application No. PCT/EP2006/050869, Feb. 19, 2007.

Jian-xin Ren, "Membrane Separation Technology and Application Thereof," $1^{st}$ Edition, Chemical Industry Publishing House, Jan. 2003, p. 13, (English-language translation of Chinese document).

Ding-yi Yu et al., Membrane Separation Engineering and Typical Examples of Design, $1^{st}$ Edition, Chemical Industry Publishing House, Jan. 2005, pp. 174-179, (English-language translation of Chinese document).

International Search Report, International Application No. PCT/EP2006/050870, mailed May 2, 2006.

International Preliminary Report on Patentability and Written Opinion, International Application No. PCT/EP2006/050870, Jun. 1, 2007.

* cited by examiner

PROCESS TO PREPARE SALT

REFERENCE TO RELATED APPLICATION(s)

This application claims the benefit of U.S. Provisional Application No. 60/654,083 filed on Feb. 18, 2005.

The present invention relates to a process to prepare salt starting from an aqueous salt solution containing at least 100 g/l of sodium chloride and a contaminating amount of polyvalent cations.

In aqueous salt solutions containing at least 100 g/l of sodium chloride from a natural source a plurality of anions and cations, typically potassium, bromide, sulphate, calcium, magnesium, strontium, iron, aluminium, barium, fluoride, iodide, and bicarbonate are present. In the preparation process of salt and the preparation processes of products wherein salt is a raw material, most of these anions and cations are to be removed. Until today, in general it has been impossible to remove polyvalent ions such as $Ca^{2+}$, $Mg^{2+}$, $Sr^{2+}$, $CO_3^{2-}$, $SO_4^{2-}$ from an aqueous salt solution to a significant degree other than by a process comprising the addition of a large amount of soda and concentrated NaOH solution to the aqueous salt solution and subjecting the solution to multiple flocculation and precipitation steps. Thereafter the aqueous salt solution is typically subjected to a multiple-effect evaporation process to prepare salt. The state of the art brine purification process must be performed as an above-described multi-stage process, as otherwise scaling occurs in the evaporator train. Due to such scaling int. al. the heat transfer capacity of the evaporators decreases. The relatively pure salt so produced can be sold as is and constitutes a suitable raw material for other processes of which the major one is the production of chlorine-containing compounds, such as chlorine.

Not only the polyvalent ions already present in the sodium chloride source are to blame for the above-mentioned problem. Because of savings in costs, surface water instead of well water is used more and more as water supply to dissolve the sodium chloride source to produce brine, and, as is generally known, surface water contains many impurities as well. A distinction can be made between natural impurities and impurities related to human activity. Natural impurities may be, for example, minerals including heavy metals; organic materials such as humic acids, fulvic acids, and cell debris; and nitrate. The nature and level of impurities present in surface water as a consequence of human activity will depend on the particular water source. Typically, organics, polyvalent ion impurities such as heavy metal ions, and/or polyvalent salts are present. The choice of surface water as the water supply leads to the additional disadvantage that part of the organics present in the water supply may disrupt the flocculation and precipitation purification steps, as a result of which an increased amount of polyvalent ions will end up in the brine. It was found that in particular the presence of organic materials in the water supply, typically fulvic acids, humic acids, or derivatives thereof, microorganisms or cell debris, causes this undesired effect. Moreover, part of the organic materials present in the water may end up as contaminations in the salt. As a result the TOC (Total Organic Carbon) level of the salt may become undesirably high. Especially when the salt is to be used for electrolysis purposes, this is highly undesired.

Part of the just-mentioned problems can be solved by incorporating additional purification steps in the salt preparation process, such as installing a brine filter in addition to the soda purification. However, such a state of the art process to prepare purified salt comprises many steps which all require large reactors and settlers, therefore lowering the economic attractiveness. Furthermore, the investment costs of such installations are high. Also, a large amount of chemicals, such as soda and caustic, is needed, which is undesired. Moreover, a state of the art process without any additional purification steps requires a not too heavily contaminated aqueous salt solution as a starting material, as it has become clear that aqueous salt solutions comprising a large amount of impurities are impossible to purify to a sufficient degree using the state of the art process.

Hence, there is a need in the market for a process to prepare salt starting from an aqueous salt solution comprising at least 100 g/l of sodium chloride, more specifically brine, that is simpler and does not require a series of large reactors and the addition of large amounts of chemicals and wherein other water supplies than well water, such as surface water, can be used to dissolve the salt source while good quality salt can still be obtained. Also, if it were possible to remove polyvalent ions from an aqueous solution containing at least 100 g/l of sodium chloride to a greater extent, this aqueous solution might be of a lower quality, i.e. might contain a higher amount of undesired polyvalent ions, optionally even together with a higher amount of organic contaminations, but would remain suitable for the production of salt.

U.S. Pat. No. 5,858,240 discloses a chloralkali process wherein salt solutions comprising at least 50 g/l of sodium chloride are purified by a nanofiltration step to remove undesirable ions therefrom and subsequently reacted to chlorine or sodium chlorate by an electrolysis step. Said nanofiltration process is simpler than the state of the art processes comprising multiple settling steps and it does not involve the addition of large amounts of chemicals either. However, the retention of calcium and magnesium as disclosed in this document is still subject to improvement. Especially, as demonstrated by the examples of this reference, when the amount of sodium chloride in the aqueous salt solution is increased, the retention of calcium decreases strongly, the calcium retention being 56.3% when the sodium chloride concentration is 139.6 g/l and only 12.3% when the sodium chloride concentration is increased to 288.7 g/l. Consequently, the purification step wherein these undesired ions are removed from the aqueous salt solution becomes more troublesome as the salt concentration increases, since the (undesired) passage of calcium ions through the nanofiltration membrane together with the purified salt solution increases considerably at higher salt concentrations. Because the amount of polyvalent cations remaining in the permeate stream of U.S. Pat. No. 5,858,240 is still significant, especially in brine streams with desired (high) sodium chloride concentration, the process disclosed in U.S. Pat. No. 5,858,240 is not suitable for preparing salt by simply performing a final concentrating step.

GB 2,395,946 relates to a process wherein seawater is purified by subjecting the solution to a nanofiltration step. The seawater is sent to a nanofiltration process with a higher rejection of sulphate ions relative to sodium ions or chloride ions. Subsequently, the permeate from the nanofiltration process is sent to a thermal desalination process in order to increase the sodium chloride concentration in the water. Finally, the sodium chloride is precipitated out in a crystallizer. The retentate obtained after the nanofiltration step may be discharged to an outfall, or it can be sent to a process for mineral recovery of components such as magnesium, sulphate, or calcium.

It is mentioned that in the nanofiltration process one has to ensure that the brine concentration is sufficiently low to prevent precipitation of calcium carbonate. GB 2,395,946 does not disclose the nanofiltration of concentrated sodium chloride streams, i.e. aqueous salt solutions comprising at least 100 g/l of sodium chloride.

WO 2004/096404 relates to a process involving the use of an antisolvent comprising the steps of (i) feeding water to an inorganic salt source to form an aqueous solution comprising said salt, (ii) feeding said aqueous solution to a crystallizer/settler, (iii) contacting said aqueous solution with one or more antisolvents which force the salt to at least partly crystallize, with at least one of said antisolvents exhibiting crystal growth inhibiting properties and/or scaling inhibiting properties, and where if the antisolvents do not exhibit sufficient inhibiting properties, one or more crystal growth inhibitors are added to the antisolvents and/or to the aqueous solution, and/or one or more scaling inhibitors are added to the antisolvent and/or to the aqueous solution, (iii) feeding the overflow of the crystallizer/settler comprising one or more antisolvents and an aqueous salt solution to a nanofiltration unit comprising a membrane to separate the one or more antisolvents from the aqueous salt solution, and (iv) removing the crystallized salt from the crystallizer/settler in an aqueous slurry. This reference does not relate to a process wherein the permeate obtained after the nanofiltration step is concentrated to produce salt. Furthermore, it relates to an antisolvent crystallization process, i.e. a process to produce salt wherein one or more antisolvents are added to a crude, not previously purified, salt solution to effectuate crystallization. However, it does not relate to a process to purify a crude brine using nanofiltration.

We have found a process to prepare salt wherein the retention of polyvalent ions, such as calcium, in aqueous solutions containing at least 100 g/l of sodium chloride can be significantly increased, so that in a subsequent step the aqueous salt solution can be concentrated to give salt of the desired quality.

The invention provides a process to prepare purified salt using an aqueous salt solution containing at least 100 g/l of sodium chloride and a contaminating amount of polyvalent cations comprising the steps of
 (i) preparing an aqueous salt solution containing at least 100 g/l of sodium chloride and at least 0.01 ppm of polyvalent cations by dissolving a sodium chloride source in industrial water,
 (ii) adding an effective amount of at least one positive retention enhancing component to the aqueous salt solution,
 (iii) subsequently subjecting the solution to a nanofiltration step, thereby separating the solution into a retentate which is enriched for the polyvalent cations and a permeate which is the purified aqueous salt solution, and
 (iv) concentrating the permeate to produce salt.

By the term "positive retention enhancing component" is meant any additive which, when added to an aqueous solution comprising calcium and other polyvalent cations such as magnesium, strontium, iron, barium, and/or aluminium, will lead to an increase in retention of calcium and preferably also in retention of one or more of the polyvalent cations selected from the group consisting of magnesium, strontium, iron, barium and aluminium, when this solution is subjected to a nanofiltration step. In order to determine whether or not an additive is suitable for use as a positive retention enhancing component (PREC) in the process according to the present invention, the following test can be used.

A synthetic brine is prepared by dissolving 1,120 g of ultrapure sodium chloride ex Merck in 3,600 g of water. Subsequently, 17.04 g of $Na_2SO_4$ and 13.2 g of $CaCl_2$ are dissolved in the synthetic brine. The resulting brine, denoted as synthetic brine, is fed into a DSS lab-stak M20 unit containing 0.036 $m^2$ of the nanofiltration membrane Desal® 5DK (ex GE/Osmonics). The membrane unit is operated at 30 bar pressure and ambient temperature with a cross-flow rate of 600 l/h. The unit is operated for 1 hour in total recycle mode (retentate and permeate are recycled to the feed vessel). Subsequently, a permeate sample of 50 ml is collected and the Ca retention is determined by measuring the Ca concentrations of a permeate and a retentate sample after acidification and dilution with nitric acid using simultaneous Inductively Coupled Plasma-Emission Spectrometry (ICP-ES). This is the blank experiment. In a second experiment, 300 ppm of an additive is added to said synthetic raw brine. If a precipitate is formed, the additive is considered not to be suitable for use as a PREC in the process according to the invention. If formation of a precipitate is not visually observed, the just-described nanofiltration experiment is repeated. The additive is considered to be a positive retention enhancing component if for the Ca retention an absolute increase of at least 5% is observed as compared to the blank experiment.

It has surprisingly been found that when using the above process, in step (iii) an absolute increase in the retention of calcium of at least 5%, preferably 7%, most preferably at least 10% is observed as compared to a process wherein the same aqueous solution without the positive retention enhancing component is subjected to such a nanofiltration step. The at least 5% absolute increase in retention can be achieved for all claimed aqueous salt solutions, i.e. solutions having a sodium chloride concentration ranging from 100 g/l up to those that are saturated and even supersaturated in their sodium chloride concentration. It is noted that if in a process wherein an aqueous solution not comprising a positive retention enhancing component is subjected to a nanofiltration step (i.e. in a blank experiment) the observed retention of calcium is already between 90% and 97%, employing the process according to the present invention will still result in an increase in retention, yet the absolute increase will be smaller than 5% although it will be at least 1%. It is noted that if the retention of calcium is already more than 97% for the blank, an increase in retention upon addition of a positive retention enhancing component is still to be expected, but this will no longer have practical use. Preferably, the process according to the present invention is therefore employed for a brine of which the retention of calcium in the absence of a positive retention enhancing component lies between 2 and 97%, more preferably, between 4 and 90%, most preferably, between 5 and 75%.

It is furthermore noted that generally also an increase in retention of other polyvalent cations present in the aqueous salt solution, such as magnesium, strontium, iron, barium, and/or aluminium, is observed. The observed absolute increase in retention usually also exceeds 5%.

The PREC used in the process according to the present invention is preferably selected from the group consisting of polycarboxylic acids, polyacrylates, polymaleic acids, oligopeptides, polypeptides, polymers bearing two or more ester groups or carboxyalkyl groups and optionally also phosphate, phosphonate, phosphino, sulphate and/or sulphonate groups; sugars, such as functionalized or unfunctionalized monosaccharides, disaccharides, and poly-saccharides; ferrocyanide salts; quaternary ammonium salts; cyclodextrines; urea; polymers bearing amino groups; polymers bearing one or more alcohol groups; polymers bearing quaternary ammonium groups; polymers comprising nitrogen-containing aliphatic rings; sodium salts of polymers bearing anionic groups; chloride salts of polymers bearing cationic groups; surfactants from a natural source such as disproportionated rosin acid soap; lactic acid; phospholipids; a suspension of yeast cells; a suspension of algae; maleic anhydride homopolymer; amylase; protease; sodium citrate; citric acid; nonanoyloxybenzene sulphonate; polyepoxysuccinic acid; polyacrylamide; sodium ethylenediamine tetraacetate; ethylenediamine tetramethylene phosphonic acid; sulphonated polyoxyethylene ethers; fatty acids; orange juice; apple juice; and Fe(II) or Fe(III) iron complexes with one of the above-mentioned compounds.

More preferably, the PREC is selected from the following group of components that contain no or a very low amount of nitrogen: polycarboxylic acids, poly-acrylic acids, polymaleic acids, and polymers bearing two or more ester groups or carboxyalkyl groups and optionally also phosphate, phosphonate, phosphino, sulphate and/or sulphonate groups; sugars, such as functionalized or unfunctionalized monosaccharides, disaccharides, and polysaccharides; cyclodextrines; polymers bearing one or more alcohol groups; sodium salts of polymers bearing anionic groups; surfactants from a natural source such as disproportionated rosin acid soap; lactic acid; a suspension of yeast cells; a suspension of algae; maleic anhydride homopolymer; sodium citrate; citric acid; sulphonated polyoxyethylene ethers; fatty acids; orange juice; apple juice; and Fe(II) or Fe(III) iron complexes with one of the above-mentioned compounds. Nitrogen-containing components are less preferred since if traces thereof end up in the salt, they will give difficulties in electrolysis operations because of the formation of $NCl_3$. Especially when the $NCl_3$ accumulates, which is the case if chlorine gas is liquified as is common in commercial electrolysis operations, its formation is highly undesired because the resulting product is explosive.

In an even more preferred embodiment the PREC is selected from the group of ecologically sound components: (poly)carboxylic acids, phosphinocarboxylic acids, poly-acrylic acids, polymaleic acids, glucose, sucrose, saccharose or other sugars, and sodium gluconate.

Most preferred is a PREC selected from the group of the following large molecular compounds: phosphinocarboxylic acids, preferably used as the 40% aqueous solution Belsperse® 164 ex Jiangsu Jianghai Chemical Co., and polymaleic acids, preferably used as the 50% aqueous solution Drewsperse® 747A ex Ashland Inc.

Typically, the total amount of PRECs which needs to be added in step (ii) of the process according to the present invention to be effective (i.e. to effectuate an absolute 5% increase in retention for at least the polyvalent cation calcium compared to the blank) is at least 15 ppm. Preferably, the total amount of PRECs added in step (ii) of the process is at least 25 ppm, more preferably at least 35 ppm, and most preferably at least 50 ppm. Preferably, the total amount of PRECs added in step (ii) of the process according to the present invention is less than 5,000 ppm, more preferably less than 1,000 ppm, even more preferably less than 500 ppm, and most preferably less than 350 ppm. The PREC may be added to the aqueous salt solution in pure form (solid or liquid) or as a solution in water.

It is noted that the term "industrial water" as used throughout this specification is meant to denote water obtained from surface water sources or from any other, comparable water source containing mineral, gaseous, and/or organic impurities in concentrations such that without purification the water is not suitable as drinking water. Preferably, surface water, more preferably water from canals, ditches, ponds, and most preferably from lakes, rivers, is used as industrial water.

An additional advantage of the process according to the invention is that sulphate ions that may be present in an aqueous salt solution will also be removed during the nanofiltration step, because of the generally good to excellent sulphate retention properties of the nanofiltration membranes suitable for use in the present process. The low sulphate content of the purified aqueous salt solution from which salt is to be isolated (i.e. the permeate of step (ii) of the present process) compared to the purified salt solution from which salt is isolated in conventional salt production processes wherein no nanofiltration step is employed, has additional advantages. Firstly, using the process according to the invention, salt with a very low sulphate content is produced. Secondly, the purge stream of the final concentration step is significantly reduced. As is generally known, concentration of permeate to produce salt, e.g. by evaporation, is typically limited by the required salt quality, because during the concentration step the concentration of impurities will increase. Hence, if impurity concentrations in the feed to the concentration step are decreased, the concentration factor can be increased and the purge decreased while still producing salt with the required quality. More specifically, in many salt plants the purge flow is determined by the final sulphate concentration in the mother liquor. Therefore, reduction of the sulphate content in the aqueous solution to be concentrated leads to significant reduction of the purge. Thirdly, during the concentration step, e.g. by evaporation of water, high sulphate concentrations can lead to scaling, thus reducing heat transfer efficiency. Hence by reducing the sulphate concentrations in the feed to the concentration step, scaling is reduced. As a result, higher energy efficiency is acquired in the concentration step and, therefore, it is not a prerequisite to concentrate in multiple steps.

To achieve the above-indicated polyvalent ion removal, no subsequent crystallization step or other treatment of the aqueous salt solution is needed. As a result of the process according to the present invention, the purified aqueous salt solution resulting from step (iii) is of such purity that it can be directly concentrated in the subsequent step (iv) to provide salt of a desired quality.

It is noted that U.S. Pat. Nos. 6,004,464 and 6,036,867 both disclose a process to purify aqueous solutions, i.e. a process to purify a spent brine water stream from a regeneration apparatus of water-softening resins and a process to purify process water or potable water, respectively. In the processes disclosed by these two documents a precipitation inhibitor selected from the group of, for instance, polyacrylic acids and polycarboxylic acids is added to the aqueous salt solution and the water stream is subjected to a membrane of the nanofiltration type to remove polyvalent cations. In U.S. Pat. No. 6,004,464, a soluble sulphate salt and a strong acid need to be added to the brines to be able to remove the hardness of the aqueous solution to an acceptable extent by nanofiltration. The aqueous solutions according to both references are aqueous salt solutions very different from those the skilled person would consider using as an input stream in the manufacturing of salt because they contain other ions and, in so far as they contain the same ions, many of these are present in quite different amounts. The aqueous solutions of U.S. Pat. No. 6,036,867 would not even be of any practical use in the production of salt, as they are much more diluted and the removal or, alternatively, the transport of large amounts of water makes salt production processes inefficient and more expensive.

An optional polishing step may be performed in the process according to the invention. Preferably, such an additional polishing step takes place between step (iii) and step (iv) of the process. The polishing step may include feeding the aqueous solution to an ion exchange process or subjecting the aqueous solution to a $CaCO_3$ precipitation step in order to remove the last traces of polyvalent ions from the system. It is noted that in the salt solution resulting from step (iii) of the process according to the invention so many polyvalent ions have been removed already that the optional polishing step can be performed at very low investment and chemical cost.

It is noted that the term "salt source" as used throughout this document is meant to denominate all natural source salts of which more than 25% by weight is NaCl. Preferably, such salt contains more than 50% by weight of NaCl. More preferably, the salt contains more than 75% by weight of NaCl, while a salt containing more than 90% by weight NaCl is most preferred. The salt may be solar salt (salt obtained by evaporating water from brine using solar heat), rock salt, and/or subterraneous salt deposits. When said salt source is dissolved in industrial water to yield an aqueous salt solution comprising at least 100 g/l of sodium chloride, it will comprise a total amount of at least 0.01 ppm of polyvalent cationic contaminants.

Preferably, the salt source is a subterraneous salt deposit exploited by means of dissolution mining using industrial water. If the salt source is rock salt or solar salt, it is preferably transported to a salt dissolver to which industrial water is added in order to prepare the aqueous salt solution according to the present invention. The required amount of one or more positive retention enhancing components according to the present invention is added to the thus prepared aqueous salt solution. However, it is also possible to add the PRECs to the salt source prior to the dissolution step or to the industrial water prior to the dissolution step. A combination of these procedures is also possible.

In an alternative embodiment of the process according to the present invention, the concentration of sodium chloride may be adjusted to be at least 100 g/l in a step subsequent to or simultaneous with the addition of one or more positive retention enhancing components to the aqueous solution and before nanofiltration step (iii).

Preferably, the aqueous salt solution in the processes of the present invention comprises at least 150 g/l of sodium chloride, more preferably at least 200 g/l, even more preferably at least 250 g/l, even more preferably still at least 300 g/l; most preferred is a saturated sodium chloride solution.

In a preferred embodiment of the present invention a permeate is formed which is an aqueous solution near-saturated in sodium chloride. The term "near-saturated solution" denotes a solution which comprises more than 80 wt %, preferably more than 90 wt %, more preferably more than 95 wt %, and most preferably more than 98 wt % of the total amount of salt dissolved in a saturated solution. This can be achieved for example by subjecting an aqueous salt solution which is already a near-saturated solution to the nanofiltration step wherein the sodium chloride retention is close to 0%. In that case, in a subsequent concentration step water is removed and salt production is almost immediately achieved, as the salt concentration is equal to the solubility limit.

In another embodiment of the present invention, at least part of the retentate is reused as industrial water in the dissolution step. Hence, it is recycled to the dissolver or the subterraneous salt deposit. Recycling the retentate to the dissolver or the subterraneous salt deposit has the following advantages. The aqueous salt solution which is subjected to the nanofiltration step comprises at least one positive retention enhancing component (PREC). A recycle of the retentate to the dissolver thus reduces the amount of PRECs that needs to be added to said aqueous salt solution. Furthermore, because polyvalent ionic impurities are significantly retained by the nanofiltration membrane, these will accumulate in the brine that is recycled to the dissolver or the subterraneous salt deposit. Eventually, they will reach their solubility limits and, thus, they will be deposited, e.g. in the form of anhydrite or polyhalite, at the bottom of the dissolver, where they can be easily removed via the sludge, or at the bottom of the cavern.

In this embodiment it is possible to add one or more conventional retarding agents such as for example described in EP 1 404 614 to the crystallizer, dissolver, or subterraneous salt deposit in order to further reduce the amount of contaminations present in the salt source that will dissolve in the aqueous salt solution.

In another embodiment the polyvalent cations comprise besides calcium, the polyvalent cations magnesium, strontium, iron, barium, aluminium or a mixture of two or more of those cations. In a further preferred embodiment the contaminating amount of polyvalent cations is less than 20,000 ppm and at least 0.01 ppm, more preferably less than 10,000 ppm, even more preferably less than 4,000 ppm, and most preferably less than 2,000 ppm. In a more preferred embodiment the contaminating amount is at least 0.1 ppm, even more preferably at least 10 ppm, most preferably at least 100 ppm.

Preferably, the amount of either calcium or magnesium in the aqueous salt solution is less than 2,000 ppm, preferably less than 1,800 ppm, more preferably less than 1,600 ppm, most preferably less than 1,400 ppm. More preferably, the combined amount of calcium and magnesium is less than 2,500 ppm, preferably less than 2,000.

In another embodiment of the processes of the invention, the amount of sulphate anions in the aqueous salt solution is less than 75,000 ppm, preferably less than 50,000 ppm, more preferably less than 25,000 ppm, even more preferably less than 10,000 ppm, most preferably less than 8,000 ppm.

It is noted that the "nanofiltration membrane", which is placed inside a membrane nanofiltration unit, as referred to throughout this specification is meant to denote any conventional nanofiltration membrane designed to selectively reject divalent and other polyvalent anions and having a molecular weight cut-off of at least 100 dalton (Da), preferably at least 150 Da, and wherein the molecular weight cut-off is at most 25,000 Da, preferably at most 10,000 Da, more preferably at most 2,500 Da, and most preferably at most 1,000 Da. The nanofiltration system preferably utilizes semipermeable membranes of the nanofiltration type, such as those sold as FilmTec® NF270 (The Dow Chemical Company), DESAL® 5DK, DESAL® 5DL, and DESAL® 5HL (all GE/Osmonics), NTR® 7250 (Nitto Denko Industrial Membranes), and AFC®-30 (PCI Membrane Systems LTD). These and similar membranes suitable for use in the process according to the present invention are effective for rejecting a high percentage of all divalent anions and especially sulphate and carbonate, as indicated by an observed sulphate retention in excess of 80%, and preferably in excess of 90% during processing of a 1 g/L $MgSO_4$ solution in demineralized water in full recycle operation, while permitting passage through the membrane of a high percentage of all monovalent anions and especially chloride and bromide, as indicated by a chloride retention below 80% and preferably below 70% during processing of a 1 g/L NaCl solution in demineralized water in full recycle operation. Tests with these solutions should be conducted at ambient temperature, a membrane flux of between 20 $l/m^2 \cdot h$ and 30 $l/m^2 \cdot h$, and a cross-flow velocity to avoid strong concentration polarization. Sodium chloride and magnesium sulphate retentions in these tests can be determined using calibrated conductivity measurements. Although the use of nanofiltration-type semipermeable membranes such as the just-mentioned membrane types is preferred, other nanofiltration membranes having these high divalent ion rejection characteristics are commercially available and may alternatively be employed.

It is noted that because nanofiltration membranes are very sensitive to mechanical damage of the top layer due to any solids present in the feed, it is recommended not to add any additives to the aqueous solution that will cause precipitation of any components present therein prior to step (iii) of the present process. It is respect it is noted that, in particular, it is preferred not to have any additives having an antisolvent effect present in the aqueous solution.

Concentrating the permeate to produce salt, i.e. the concentrating step, may be performed using any concentrating method for salt production processes known to the person skilled in the art and includes evaporative and cooling crystallization. Preferably, antisolvent(s) is/are not used to effectuate crystallization of salt from the permeate.

The process according to the present invention is further illustrated by the following examples.

EXAMPLES

In the examples the following definition is used:

Retention={1−(concentration of component in permeate/concentration of component in retentate)}× 100%

Example 1

An experiment was performed using two membrane types, a 4-inch spiral wound NF® 270 polyamide thin film NF membrane (ex DOW Chemical Company FilmTec™) and a 4-inch spiral wound Desal® 5DK polyamide NF membrane (ex GE/Osmonics) with 7.6 m² and 8.4 m² membrane surface area, respectively. The membrane modules were tested in parallel in a pilot unit, which was operated in continuous feed and bleed operation mode at a cross-flow rate of around 3 m³/h per membrane module. Mother liquor obtained from a sodium chloride crystallizer was supplied to the unit. The pH of the mother liquor was reduced to pH 10.7 using a concentrated (35%) $H_2SO_4$ solution. Furthermore, 101 ppm of a positive retention enhancing component was added to the mother liquor by the addition of 202 ppm of Drewsperse® 747A ex Ashland Inc., which is a 50% aqueous solution of polymaleic acid. The resulting mother liquor sent to the membrane pilot unit contained, amongst others, 280 g/l NaCl, 0.25 meq/L calcium, 0.06 meq/L strontium, and 1,190 meq/L $SO_4^{2-}$. The majority of the retentate was recycled to the membrane feed line (cross-flow operation), while part of the retentate was purged together with the permeate to obtain a concentration factor (the ratio of the fresh feed flow over the purged retentate flow) of approximately 1.3. During membrane filtration at 32 bar pressure and 40° C. calcium retentions of 99% were obtained for Desal® 5DK and NF® 270 and strontium retentions of 88%.

Comparative Example 2

Another experiment was performed using two membrane types, flat sheet NF® 270 polyamide thin film NF membranes (ex DOW Chemical Company FilmTec™) and flat sheet Desal® 5DK polyamide NF membranes (ex GE/Osmonics). The membrane types were tested simultaneously in a DSS lab-stak M20 unit, which was operated in continuous feed and bleed operation mode at a cross-flow rate of 600 L/h. In total 0.144 m² membrane surface area was installed. Mother liquor obtained from a sodium chloride crystallizer was supplied to the unit. The pH of the mother liquor was reduced to pH 10.8 using a concentrated $H_2SO_4$ solution. No positive retention enhancing component was added. The mother liquor sent to the DSS unit contained, amongst others, 1,150 meq/L $SO_4^{2-}$, 296 g/l NaCl, 1.3 mg/l $Ca^{2+}$, and 655 mg/l $Br^-$. Membrane filtration was performed at 50 bar pressure and 32° C. temperature. The majority of the retentate was recycled to the membrane feed line (cross-flow operation), while part of the retentate was purged together with permeates to obtain a concentration factor of approximately 1.3. The membranes showed calcium retentions below 32%.

Comparative Example 3

Another experiment was performed using two membrane types, flat sheet NF® 270 polyamide thin film NF membrane (ex DOW Chemical Company FilmTec™) and flat sheet Desal® 5DK polyamide NF membrane (ex GE/Osmonics). The membrane types were tested simultaneously in a DSS lab-stak M20 unit, which was operated in total recycle mode (total retentate and permeates were recycled to the membrane supply vessel) at a cross-flow rate of 600 L/h. In total 0.36 m² membrane surface area was installed. Raw brine obtained from a brine source was supplied to the unit. No positive retention enhancing component was added. The raw brine sent to the DSS lab-stak unit contained, amongst others, 1.21 g/l $SO_4^{2-}$, 273 g/l NaCl, 3.3 mg/l strontium, 10.3 mg/l magnesium, and 494 mg/l $Ca^{2+}$. Membrane filtration was performed at 21 bar pressure and 22° C. temperature. Desal® 5DK and NF® 270 showed 36% and 24% calcium retention, respectively, and strontium retentions below 59%. The magnesium retentions for Desal® 5DK and NF® 270 were found to be 68% and 66%, respectively. The sulphate retentions for Desal® 5DK and NF® 270 were found to be 94.2% and 95.9%, respectively.

Example 4

An experiment was performed using two membrane types, a 4-inch spiral wound NF® 270 polyamide thin film NF membrane (ex DOW Chemical Company FilmTec™) and a 4-inch spiral wound Desal® 5DK polyamide NF membrane (ex GE/Osmonics) with 7.6 m² and 8.4 m² membrane surface area, respectively. The membrane modules were tested in parallel in a pilot unit, which was operated in continuous feed and bleed operation mode at a cross-flow rate of 3.1 m³/h and 2.6 m³/h per membrane module for NF® 270 and Desal® 5DK, respectively. Mother liquor obtained from a sodium chloride crystallizer was supplied to the unit. The pH of the mother liquor was reduced to pH 10.6 using a concentrated (35%) $H_2SO_4$ solution. Furthermore, 96 ppm of a positive retention enhancing component was added to the mother liquor by the addition of 192 ppm Drewsperse® 747A (see Example 1). The resulting mother liquor sent to the membrane pilot unit contained, amongst others, 280 g/l NaCl, 0.046 meq/L fully dissolved calcium, and 1,125 meq/L $SO_4^{2-}$. The majority of the retentate was recycled to the membrane feed line (cross-flow operation), while part of the retentate was purged together with the permeate to obtain a concentration factor (the ratio of the fresh feed flow over the purged retentate flow) of approximately 1.3 and 1.2 for NF® 270 and Desal® 5DK, respectively. During membrane filtration at 32 bar pressure and 34° C. and 39° C. for NF® 270 and Desal® 5DK, respectively, calcium retentions of 96% and 97%, respectively, were obtained for Desal® 5DK and NF® 270.

Example 5

Another experiment was performed using two membrane types, flat sheet NF® 270 polyamide thin film NF membrane (ex DOW Chemical Company FilmTec™) and flat sheet Desal® 5DK polyamide NF membrane (ex GE/Osmonics), and a raw brine from the same source as specified in Comparative Example 3. Furthermore, 300 ppm of a positive retention enhancing component was added to the raw brine by the addition of 600 ppm Drewsperse® 747A (see Example 1). The membrane types were tested simultaneously in a DSS lab-stak M20 unit, which was operated in total recycle mode (the total retentate and the permeates were recycled to the membrane supply vessel) at a cross-flow rate of 600 L/h. In total 0.216 m² membrane surface area was installed. Raw brine obtained from a brine source was supplied to the unit. The raw brine sent to the DSS lab-stak unit contained, amongst others, 1.11 g/l $SO_4^{2-}$, 289 g/l NaCl, 3.0 mg/l strontium, 10.1 mg/l magnesium, and 490 mg/l $Ca^{2+}$. Membrane filtration was performed at 31 bar pressure and 21° C. temperature. Desal® 5DK and NF® 270 showed 79% and 50% calcium retention, respectively, strontium retentions of 90% and 70%, respectively, and magnesium retentions of 93% and 79%, respectively. Both membranes showed 0.6% chloride retention. Desal® 5DK and NF® 270 showed 96.8% and 98.5% sulphate retention, respectively.

As demonstrated by Examples 1, 4, 5 and Comparative Examples 2 and 3, the retention of calcium and strontium ions using the process according to the invention is significantly increased compared to processes where no positive retention enhancing component is added to the aqueous salt solution before it is subjected to a nanofiltration step, and therefore the resulting aqueous salt solution is suitable for direct use in the preparation of salt of good quality.

Comparative Example 6

Another experiment was performed using flat sheet Desal® 5DK polyamide NF membranes (ex GE/Osmonics). The membranes were tested simultaneously in a DSS labstak M20 unit, which was operated in batch concentration mode (the total retentate was recycled to the membrane unit feed supply vessel, while the permeates produced were removed from the unit and sent to a separate vessel) at a cross-flow rate of 600 L/h. In total 0.108 m² membrane surface area was installed. In total 2 kg permeate was produced, thereby concentrating the feed by a factor 1.1. As feed a raw brine from an Akzo Nobel brine production plant in Mariager, Denmark, was supplied to the unit. No positive retention enhancing component was added. The raw brine sent to the DSS labstak M20 unit contained, amongst others, 1.24 g/l $SO_4^{2-}$, 308 g/l NaCl, 3.1 mg/l strontium, 10.3 mg/l magnesium, and 494 mg/l $Ca^{2+}$. Membrane filtration was performed at 31 bar pressure and 21° C. temperature. Desal® 5DK membranes initially showed 42% calcium retention and at a concentration factor of approximately 1.1 (meaning that approximately 10% of the initial feed batch was removed as permeate), 49% calcium retention.

Comparative Example 7

An evaporative crystallization experiment was performed by concentrating 2,000 g of permeate produced in Comparative Example 6 (i.e. without using a positive retention enhancing component) in a heated beaker glass equipped with a magnetic stirrer. The experiment was performed at the boiling point of the filtered brine, i.e. at about 108° C. The concentration factor was 2.8, meaning that 1,050 grams of water were evaporated from the original brine solution. Subsequently, the salt produced was removed by filtering over a Büchner filter. The filtrate was further concentrated by evaporative crystallization at 108° C. to arrive at an overall concentration factor of 10. The salt produced was obtained by filtering over a Büchner filter and analyzed for its calcium content. The calcium found in the salt produced in the last concentration step contributed 386 mg/kg.

Example 8

Another experiment was performed using flat sheet Desal® 5DK polyamide NF membranes (ex GE/Osmonics) and a raw brine from the same source as specified in Comparative Example 6. Furthermore, 300 ppm of the positive retention enhancing component was added to the raw brine by the addition of 600 ppm Drewsperse® 747A (see Example 1). The membranes were tested simultaneously in a DSS labstak M20 unit, which was operated in batch concentration mode (the total retentate was recycled to the membrane unit feed supply vessel, while the permeates produced were removed from the unit and sent to a separate-vessel) at a cross-flow rate of 600 L/h. In total 0.108 m² membrane surface area was installed. In total 1.7 kg permeate were produced, thereby concentrating the feed by a factor 1.1. The raw brine sent to the DSS labstak M20 unit contained, amongst others, 1.24 g/l $SO_4^{2-}$, 308 g/l NaCl, 3.1 mg/l strontium, 10.3 mg/l magnesium, and 494 mg/l $Ca^{2+}$. Membrane filtration was performed at 31 bar pressure and 22° C. temperature. Desal® 5DK membranes initially showed 66% calcium retention and at a concentration factor of approximately 1.1 (meaning that approximately 10% of the initial feed batch was removed as permeate), 71% calcium retention. The use of the positive retention enhancing component therefore results in clearly higher calcium retentions of the membrane (see Comparative Example 6).

Example 9

An evaporative crystallization experiment was performed by concentrating 1,700 g of permeate produced in Example 8 (using Drewsperse® 747A as a positive retention enhancing component) in a heated beaker glass equipped with a magnetic stirrer. The experiment was performed at the boiling point of the filtered brine, i.e. at about 108° C. The concentration factor was 2.8, meaning that 830 grams of water were evaporated from the original brine solution. Subsequently, the salt produced was removed by filtering over a Büchner filter. The filtrate was further concentrated by evaporative crystallization at 108° C. to arrive at an overall concentration factor of 10. The salt produced was obtained by filtering over a Büchner filter and analyzed for its calcium content. The calcium found in the salt produced in the last concentration step contributed 145 mg/kg.

As demonstrated by Examples 8, 9 and Comparative Examples 6 and 7, the retention of calcium ions using the process according to the invention is significantly increased compared to the process where no positive retention enhancing component is added to the aqueous salt solution prior to nanofiltration. Besides this advantage, the salt produced according to the invention contains significantly lower amounts of calcium (i.e. a 62% decrease in calcium content in the salt produced in Example 9 compared to the salt produced in Comparative Example 7). It can thus be concluded that the salt prepared according to the invention is of significantly better quality.

The invention claimed is:

1. A process to prepare salt comprising the following steps:
  (i) preparing an aqueous salt solution containing at least 100 g/l of sodium chloride and at least 0.01 ppm of polyvalent cations by dissolving a sodium chloride source containing more than 25% by weight sodium chloride in industrial water, (ii) adding an effective amount of at least one positive retention enhancing component to the aqueous salt solution, (iii) subsequently subjecting the solution to a nanofiltration step, thereby separating the solution into a retentate which is enriched for the polyvalent cations and a permeate which is the purified aqueous salt solution, and (iv) concentrating the permeate to produce salt.

2. The process according to claim 1 further comprising adjusting the concentration of sodium chloride to be at least 100 g/l in a step subsequent to or simultaneous with step (ii) of adding the positive retention enhancing component to the aqueous solution and before nanofiltration step (iii).

3. The process according to claim 1 wherein at least part of the retentate is recycled for use in dissolution step (i).

4. The process according to claim 1 wherein the aqueous solution comprises at least 300 g/l of sodium chloride.

5. The process according to claim 1 wherein the at least one positive retention enhancing component is selected from the group consisting of polycarboxylic acids; polyacrylates; polymaleic acids; oligopeptides; polypeptides; polymers bearing two or more ester groups or carboxyalkyl groups; sugars; ferrocyanide salts; quaternary ammonium salts; cyclodextrines; urea; polymers bearing amino groups; polymers bearing one or more alcohol groups; polymers bearing quaternary ammonium groups; polymers comprising nitrogen-containing aliphatic rings; sodium salts of polymers bearing anionic groups; chloride salts of polymers bearing cationic groups; surfactants from a natural source; lactic acid; phospholipids; a suspension of yeast cells; a suspension of algae; maleic anhydride homopolymer; amylase; protease; sodium citrate; citric acid; nonanoyloxybenzene sulphonate; polyepoxysuccinic acid; polyacrylamide; sodium ethylenediamine tetraacetate; ethylenediamine tetramethylene phosphonic acid; sulphonated polyoxyethylene ethers; fatty acids; orange juice; apple juice; and Fe(II) or Fe(III) iron complexes with one of the above-mentioned compounds.

6. The process according to claim 5 wherein polymers bearing two or more ester groups or carboxyalkyl groups also bear a member of the group consisting of phosphate groups, phosphonate groups, phosphino groups, sulphate groups, sulphonate groups and combinations thereof; the sugars are selected from the group consisting of functionalized monosaccharides, unfunctionalized monosaccharides, functionalized disaccharides, unfunctionalized disaccharides, functionalized polysaccharides and unfunctionalized polysaccharides; and the natural source is disproportionated rosin acid soap.

7. The process according to claim 1 wherein the at least one positive retention enhancing component is selected from the group consisting of (poly)carboxylic acids, phosphinocarboxylic acids, polyacrylic acids, polymaleic acids, glucose, sucrose, saccharose, and sodium gluconate.

8. The process according to claim 1 wherein the at least one positive retention enhancing component is added in an amount of at least 15 ppm.

9. The process according to claim 1 wherein the at least one positive retention enhancing component is added in an amount of less than 5,000 ppm.

10. The process according to claim 1 wherein the polyvalent ions comprise calcium, magnesium, strontium, iron, barium, and/or aluminium.

11. The process according to claim 10 wherein the amount of either calcium or magnesium in the aqueous solution is less than 2,000 ppm.

12. The process according to claim 10 wherein the amount of either calcium or magnesium in the aqueous solution is less than 1,400 ppm.

13. The process according to claim 1 wherein the amount of sulphate anions in the aqueous salt solution is less than 75,000 ppm.

14. The process according to claim 1 wherein the sodium chloride source is a natural salt source containing more than 75% by weight of NaCl.

15. The process according to claim 1 wherein the aqueous solution is a saturated sodium chloride solution.

16. The process according to claim 1 wherein the at least one positive retention enhancing component is added in an amount of at least 50 ppm.

17. The process according to claim 16 wherein the at least one positive retention enhancing component is added in an amount of less than 350 ppm.

18. The process according to claim 1 wherein the at least one positive retention enhancing component is added in an amount of less than 350 ppm.

19. The process according to claim 1 wherein the amount of sulphate anions in the aqueous salt solution is less than 8,000 ppm.

20. The process according to claim 1 wherein the sodium chloride source is a natural salt source containing more than 90% by weight of NaCl.

* * * * *